United States Patent

Lindsay et al.

[11] Patent Number: 5,823,491
[45] Date of Patent: Oct. 20, 1998

[54] SPREADER UNIT FOR MULTI-LEGGED STANDS

[75] Inventors: Richard Arthur Lindsay, Eye; Charles David Hackman, Bury St. Edmunds, both of Great Britain

[73] Assignee: Vitec Group PLC, Suffolk, United Kingdom

[21] Appl. No.: 612,151

[22] Filed: Mar. 7, 1996

[30] Foreign Application Priority Data

Mar. 10, 1995 [GB] United Kingdom .................... 9504929

[51] Int. Cl.⁶ .................................................... F16M 11/38
[52] U.S. Cl. ........................................ 248/169; 248/188.6
[58] Field of Search .................................. 248/166, 168, 248/169, 188.6

[56] References Cited

U.S. PATENT DOCUMENTS

| | | | |
|---|---|---|---|
| 2,467,567 | 4/1949 | Price | 248/169 |
| 3,921,947 | 11/1975 | Adam | 248/169 |
| 4,309,010 | 1/1982 | Posso | 248/169 |
| 4,324,477 | 4/1982 | Miyazaki . | |
| 4,453,686 | 6/1984 | Ina | 248/188.6 |
| 4,538,526 | 9/1985 | Seeley | 248/188.6 |
| 4,705,251 | 11/1987 | Samuelsson . | |
| 5,082,221 | 1/1992 | Lai | 248/168 |
| 5,082,222 | 1/1992 | Hsu | 248/188.6 |
| 5,102,079 | 4/1992 | Lee | 248/166 |
| 5,341,185 | 8/1994 | Nakatani | 248/169 |

FOREIGN PATENT DOCUMENTS

| | | | |
|---|---|---|---|
| 0921414 | 5/1947 | France | 248/169 |
| 1169146 | 4/1964 | Germany | 248/169 |
| 2 257 355 | 9/1992 | United Kingdom . | |
| 2 298 671 | 3/1995 | United Kingdom . | |
| 8101601 | 6/1981 | WIPO | 248/168 |

Primary Examiner—Rodney H. Bonck
Assistant Examiner—Matthew A. Kaness
Attorney, Agent, or Firm—Kenyon & Kenyon

[57] ABSTRACT

A spreader unit for controlling a multi-legged stand is presented comprising a hub having a central axis and a plurality of arms hinged to the hub to swing in radial planes with respect to the hub axis. A control shaft is mounted in the hub for rotation about the axis with a reversible gear drive between the shaft and arms so that rotation of the shaft swings the arms with respect to the hub in unison and vice versa. A control for locking the shaft against rotation with respect to the hub is provided to hold the arms in required spread positions with respect to the hub.

15 Claims, 2 Drawing Sheets

SPREADER UNIT FOR MULTI-LEGGED STANDS

BACKGROUND TO THE INVENTION

1. Field of the Invention

The present invention relates to a spreader unit for controlling a multi-legged stand such as a tripod for supporting a camera or the like.

2. Background Prior Art

Spreader units or spiders are commonly provided on tripods or similar stands to control the spread of the legs of the tripod in different positions of adjustment. U.K. Patent Specification No. 2,257,355 discloses such a spreader unit comprising a central carrier having a plurality of arms hinged thereto corresponding to the numbers of legs of the stand. The spread angles of the arms can be set to control the spread of the legs to which they are connected. The spreader unit is cumbersome to operate and to adjust requiring two hands to do so making it difficult to hold a tripod and adjust it at the same time. Furthermore, the legs are restrained in one direction only and are free to swing in the opposite direction with the consequential risk of potential instability.

SUMMARY OF THE INVENTION

It is an object of the present invention to provide a spreader unit which is easy and versatile to adjust and which when set, locks the arms against swinging in either direction.

The present invention provides a spreader unit for controlling a multi-legged stand comprising a hub having a central axis, a plurality of arms hinged to the hub to swing in radial planes with respect to the hub axis, a control shaft mounted in the hub for rotation about the axis, a reversible gear drive between the shaft and arms so that rotation of the shaft swings the arms with respect to the hub in unison and vice versa, and control means for locking the shaft against rotation with respect to the hub to hold the arms in required spread positions with respect to the hub.

The control means may include a control member movably mounted on the hub between a number of pre-set positions in which it may be locked to hold the arms in a corresponding number of spread positions with respect to the hub.

More specifically the control member may be mounted on the hub for rotation about the central axis to provide said movement between the pre-set positions of adjustment.

In one arrangement according to the present invention, a plurality of stop means may be provided at spaced locations in the rotary movement of the control member with which the control member is engaged by axial movement to lock the control member in a selected position of rotational adjustment.

In the latter construction spring means may be provided between the control member and hub to bias the control member axially to engage the stop means in the pre-set positions.

In the case where a control member is provided, the control member may comprise a cap mounted for rotation on the hub about said central axis.

In any of the above arrangements the control means may include releasable detent means between the shaft and the control member to allow the arms to be adjusted independently of the control member with the detent means released and then engaged to hold the arms in a selected spread position in accordance with the pre-set position of the control member.

More specifically the releasable detent means may comprise spring-loaded detent means mounted on the shaft to rotate therewith and to engage the control member, the control member having abutment means with which the detent means is engageable to lock the shaft against rotation with respect to the control member, the detent means being manually releasable from the control member for adjustment of the spreader arm.

In the case where the control member comprises a cap mounted for rotation on the hub, the detent means may comprise a boss mounted on the shaft adjacent the underside of the cap to rotate with the shaft, the boss having at least one upstanding abutment facing the underside of the cap for engagement in a corresponding recess on the underside of the cap to lock the boss against rotation with respect to the cap and means being provided for releasing the abutment to the cap to allow rotation of the boss with respect to the cap.

In one particular arrangement the boss may be mounted for axial movement with respect to the cap and shaft to allow disengagement of the abutment on the boss from the cap, the boss being spring loaded towards the underside of the cap to engage an abutment on the boss with the recess in the underside of the cap and means are provided for moving the boss against the action of the spring away from the underside of the cap, so as to disengage the abutment from the recess.

In the latter construction the means for disengaging an abutment from a recess may comprise a central button on the boss which projects through a central aperture in the cap to be manually pressed with respect to the cap to release the engaged abutment from the corresponding recess in the cap to allow adjustment of the spreader legs.

In any of the above arrangements the gear drive between the shaft and the respective arms may comprise a worm wheel on the shaft and segmental pinions on the arms, the threads on the worm and pinion being such that rotation of the shaft pivots the arms in unison and pivoting of an arm with respect to the hub rotates the shaft to pivot the other arm.

Also the legs of the spreader unit may be adjustable in length.

In the latter arrangement the legs of the spreader unit may be telescopic and may have a number of preset positions of extension.

In any of the above arrangements the hub may have three arms pivotably mounted on the hub at equi-spaced positions around the hub for controlling the spread of the legs of a tripod unit.

DESCRIPTION OF THE PREFERRED EMBODIMENT

Figure 1:
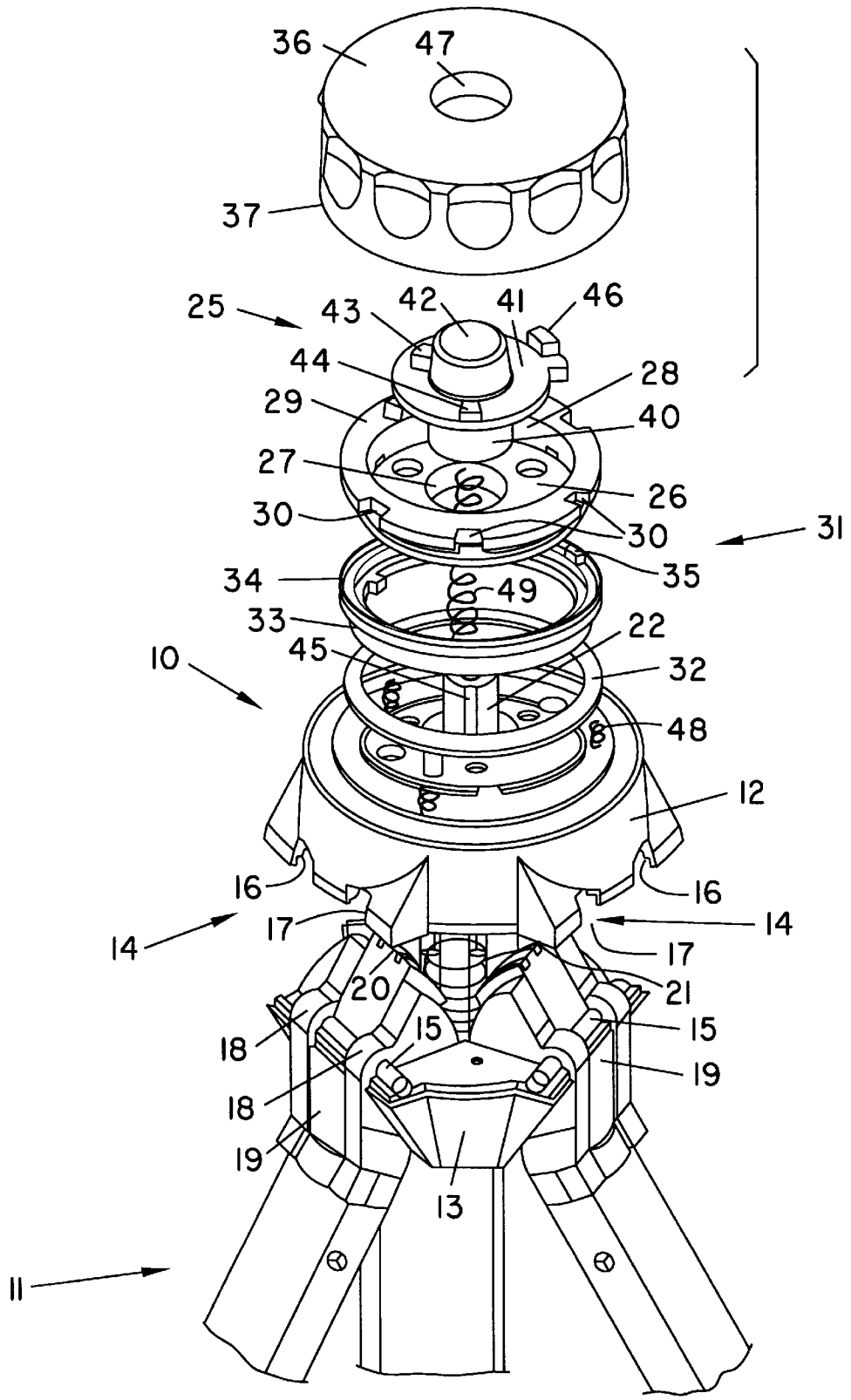
FIG. 1 is an exploded perspective view of a spreader unit for a camera tripod in accordance with the present invention.
Figure 2:
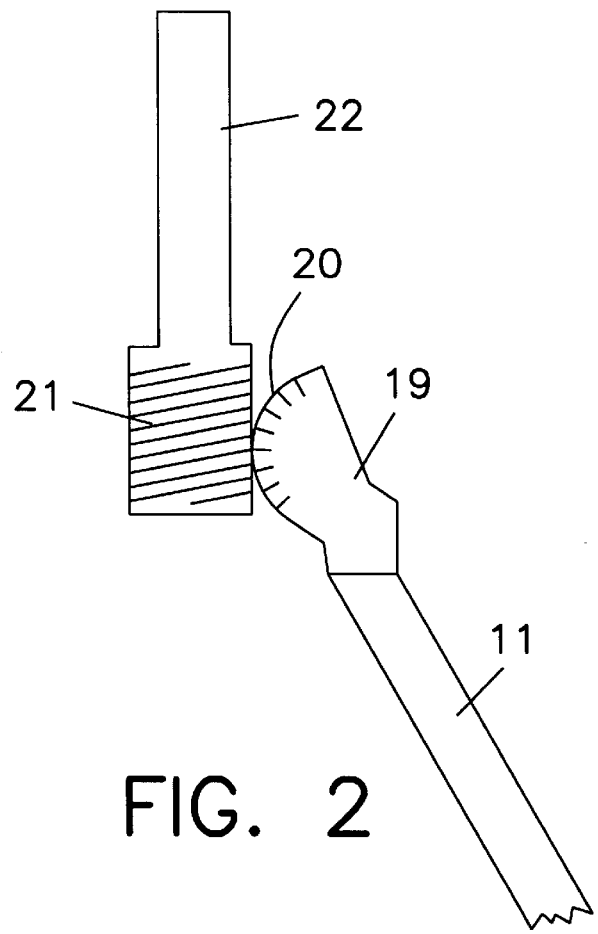
FIG. 2 shows a view of the reversible gear drive according to an embodiment of the present invention.
Figure 3:
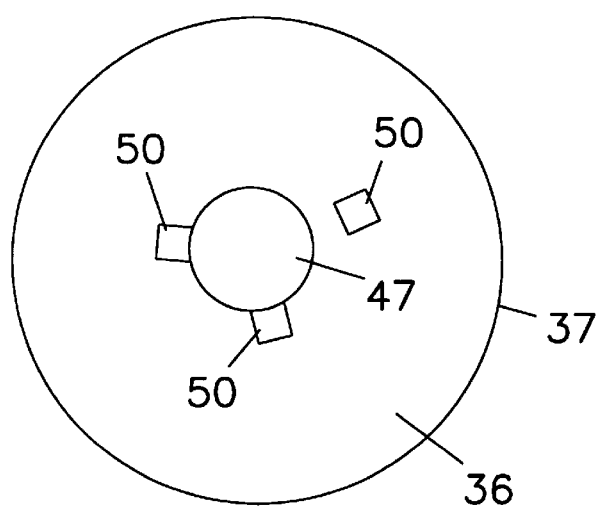
FIG. 3 shows a view of the underside of the cap according to an embodiment of the present invention.

The spreader unit illustrated comprises a central hub of generally cylindrical form indicated generally at 10 and three depending oval section spreader arms 11 pivotally mounted at equi-spaced locations around the hub for adjustment of the spread angle of the arms. Each arm 11 is of extendible telescopic construction with a detent mechanism for locking the arm in a number of positions of adjustment to vary the length of the arm. The construction of the arms is described in greater detail in our U.K. Patent Application No. 9504930.0 to which reference should be made.

The hub 10 comprises a main body part 12 and a mounting block 13 secured to the underside of the body part providing three radially extending equi-spaced slots 14. Pivot spindles 15 extend across the slots and are supported at their ends in part-cylindrical sockets 16,17 on the underside of the body 12 and in the upper face of the mounting block 13 respectively.

The upper ends of the arms 11 have pairs of spaced cheek plates 18 secured thereto which are received with a sliding fit in the respective slots 14. The plates 18 are bored to receive the spindles 15 whereby the arms 11 are supported for rotation about horizontal axes spaced about the hub 10. A segmental gear 19 is mounted at the upper end of each arm between the cheek plates 18 and has an arcuate toothed face 20.

A shaft 22 extends vertically through the centre of the body part 12 of the hub and is mounted in bearings (not shown) for rotation about a vertical axis. A worm wheel 21 is mounted at the lower end of the shaft 22 on the underside of the hub 10 in meshing engagement with the segmented gears 19. The worm wheel 21 and segmented gears 19 are formed with a fast thread which allows the worm wheel 21 to drive the gears 19 in conventional manner and vice versa.

At the upper end of the hub 20 there is a cup shaped housing indicated generally at 25 and having a base 26 formed with a central aperture 27 through which the shaft 22 projects. The base 26 of the housing 25 is secured by bolts (not shown) at the top face of the hub 10.

The base 26 has an annular surface 28 extending upwards to a peripheral flange 29 below which it is reduced in diameter in two steps (not shown) to the bottom face of base 26. The flange 29 is formed with four spaced notches 30. Below one step is a similar, correspondingly stepped ring 31 having three inner, annular shoulders 34 corresponding to steps below the flange 29. The shoulders 34 are each formed with an inwardly facing lug 35 at spaced locations around the shoulders 34 to engage in notches 10 in the flange and steps of base 26 and thereby define four rotational positions of adjustment of the ring with respect to the housing 25.

The ring 31 is trapped between the base 26 of the housing 25 and the upper side of the hub 10 with a washer 32 and three spaced coil springs 48 between the hub 10 and the underside of the ring 31 to press the ring 31 upwardly into engagement with the rim.

A cap 36 extends over the housing 25 and has a flared wall 37 which is secured to the outer periphery 33 of the ring 31. By depressing the cap 36, the ring 31 is moved downwardly against the action of the springs 48 to disengage the set of lugs 35 from the notches 30 to allow the cap 36 to be rotated and align the set of lugs 35 with another set of notches 30 so that the cap 36 is provided with a number of pre-set positions of rotation in which the cap 36 may be locked as described below.

The aforesaid housing 25 also contains a boss 40 having a plate 41 on its upper side, with a central knob 42 and three upstanding lugs 43, 44 and 46 at spaced locations around the plate and on different pitch circle diameters. The boss 40 projects through the central aperture 27 in the housing 25 and is formed with a bore (not shown) to receive the upper end of the shaft 22 and is locked against rotation with respect to the shaft 22 by means of a ridge (not shown) in the boss 40 engaging in a slot 45 in the shaft.

The cap 36 is formed with a central aperture 47 to receive the knob 42 and the underside of the cap is formed with three spaced recesses (not shown) to receive the upstanding lugs 43 to 44 an 46 in one position of rotation of the cap 36 with respect to the plate 41. The plate 41 is spring urged, by a spring 49 between the boss 40 and shaft 22 upwardly towards the underside of the cap 36 to engage a lug 43, 44 and 46 in a recess 50 in the cap 36 when brought into register and thereby lock the plate 41 against rotation with respect to the cap 36. As described earlier, the cap 36 is locked in position with respect to the hub 10 by interengagement of the set of lugs 35 in the ring 31 with a selected set of notches 30 in the housing 25 so that when the plate 41 is locked against rotation with respect to the cap 36, the shaft 22 is effectively locked against rotation in the hub 10 and the arm 11 are then locked in their positions of adjustment. To release the arms 11 to allow them to be folded together, the central knob 42 projecting through the cap 36 is depressed disengaging the lugs 44 and 46 on the underside of the cap 36 and the shaft 22 is then free to rotate allowing the arms 11 to be folded inwards. When it is required to set the mechanism to a different position of adjustment, the cap 36 is depressed towards the hub 10 disengaging lugs 35 from the current set of notches 30 in the housing 25. The cap 36 can the be rotated to another position of adjustment and the lugs 35 re-engage with a set of different notches 30. One of the arms 11 can be pivoted which causes the shaft 22 to rotate through the worm wheel 21 rotating the other arms 11 to a similar extent until one of the lugs 43 44 and 46 register with a recess 50 in the underside of the cap 36 and are then spring urged into the recess to relock the shaft 22 against rotation.

It will be appreciated that the screw mechanism between the worm wheel 21 and the segmental gears 19 on the arm 11 is of a highly efficient forms enabling the worm wheel 21 to drive the arms 11 or one of the arms 11 to drive the worm wheel 21 and with it, the remaining arms 11.

The mechanism thus provides a simple and convenient means for rotation of the spreader arms to a number of selected positions of adjustment in which the arms are locked against hinging in either direction.

What is claimed is:

1. A spreader unit for controlling a multi-legged stand comprising:

a hub having a central axis;

a plurality of arms hinged to the hub to swing in radial planes with respect to the central axis;

a control shaft mounted in the hub for rotation about the central axis;

a reversible gear drive means integrally attached at a lower end of the shaft for engaging each one of the plurality of arms when rotation of the shaft swings the plurality of arms with respect to the hub in unison, and alternatively, movement of one of the plurality of arms rotates the shaft and swings the remaining arms; and control means for locking the shaft against rotation with respect to the hub to hold the plurality of arms in a desired spread position with respect to the hub.

2. The spreader unit as claimed in claim 1, wherein the control means includes a control member movably mounted on the hub between a number of pre-set positions in which the control member may be locked to hold the arms in a corresponding number of spread positions with respect to the hub.

3. The spreader unit as claimed in claim 2, wherein the control member is mounted on the hub for a rotary movement about the central axis.

4. The spreader unit as claimed in claim 3, wherein a plurality of stop means are provided at spaced locations about the central axis rotary movement of the control member and with which the control member is locked in a selected position of rotational adjustment.

5. The spreader unit as claimed in claim 4, wherein spring means is provided between the control member and hub to bias the control member axially to engage the plurality of stop means in the pre-set positions.

6. The spreader unit as claimed in claim 2 wherein the control member comprises a cap mounted for rotation on the hub about the central axis.

7. The spreader unit as claimed in claim 1, wherein the control means includes releasable detent means between the shaft and the control member to allow the arms to be adjusted independently of the control member with the detent means released and which can then be engaged to hold the plurality of arms in a selected spread position in accordance with a pre-set position of the control member.

8. The spreader unit as claimed in claim 7, wherein the releasable detent means comprise spring loaded detent means mounted on the shaft to rotate therewith and to engage the control member, the control member having abutment means with which the detent means is engageable to lock the shaft against rotation with respect to the control member, the detent means being manually releasable from the control member for adjustment of the plurality of arms.

9. The spreader unit as claimed in claim 8, wherein when the control member comprises a cap mounted for rotation on the hub, the detent means comprises a boss mounted on the shaft adjacent the underside of the cap to rotate with the shaft, the boss having at least one upstanding abutment facing the underside of the cap for engagement in a corresponding recess on the underside of the cap to lock the boss against rotation with respect to the cap, and means is provided for releasing the abutment from the corresponding recess in the cap to allow rotation of the boss with respect to the cap.

10. The spreader unit as claimed in claim 9, wherein the boss is mounted for axial movement with respect to the cap and shaft to allow disengagement of the abutment on the boss from the cap, the boss being spring loaded towards the underside of the cap to engage an abutment on the boss with the recess in the underside of the cap and means are provided for moving the boss against the action of the spring load away from the underside of the cap to disengage the abutment with the recess.

11. The spreader unit as claimed in claim 10, wherein the means for disengaging the abutment from the recess comprise a central button on the boss which projects through a central aperture in the cap to be manually pressed with respect to the cap to release the engaged abutment from the corresponding recess in the cap to allow adjustment of the plurality of arms.

12. The spreader unit as claimed in claim 1, wherein the gear drive between the shaft and the respective arms comprises a worm wheel on the shaft and a segmental pinion on each one of the plurality of arms, a plurality of threads on the worm wheel and pinion being such that rotation of the shaft pivots the plurality of arms in unison, and alternatively, pivoting of one of the plurality of arms with respect to the hub rotates the shaft and the remaining arms.

13. The spreader unit as claimed in claim 1, wherein the plurality of arms of the spreader unit are adjustable in length.

14. The spreader unit as claimed in claim 13, wherein the plurality of arms of the spreader unit are telescopic and have a number of preset positions of extension.

15. (The spreader unit as claimed in claim 1, wherein the hub has three arms pivotably mounted on the hub at equispaced positions around the hub for controlling the spread of the three arms of a tripod unit.

* * * * *